US010057887B2

(12) United States Patent
Zhao et al.

(10) Patent No.: US 10,057,887 B2
(45) Date of Patent: Aug. 21, 2018

(54) METHOD AND DEVICE FOR TRIGGERING BUFFER STATE REPORTING BSR

(71) Applicant: China Academy of Telecommunications Technology, Beijing (CN)

(72) Inventors: Yali Zhao, Beijing (CN); Erlin Zeng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 18 days.

(21) Appl. No.: 15/300,785

(22) PCT Filed: Mar. 27, 2015

(86) PCT No.: PCT/CN2015/075283
§ 371 (c)(1),
(2) Date: Sep. 30, 2016

(87) PCT Pub. No.: WO2015/149657
PCT Pub. Date: Oct. 8, 2015

(65) Prior Publication Data
US 2017/0019893 A1    Jan. 19, 2017

(30) Foreign Application Priority Data
Mar. 31, 2014   (CN) .......................... 2014 1 0125864

(51) Int. Cl.
*H04W 72/04* (2009.01)
*H04W 24/10* (2009.01)
(Continued)

(52) U.S. Cl.
CPC ....... *H04W 72/0406* (2013.01); *H04W 24/10* (2013.01); *H04W 28/0278* (2013.01);
(Continued)

(58) Field of Classification Search
CPC .. H04W 72/0406; H04W 24/10; H04W 88/02
See application file for complete search history.

(56) References Cited

U.S. PATENT DOCUMENTS

| 2009/0219951 A1* | 9/2009 | Chun | ...................... | H04W 8/26 |
| | | | | 370/474 |
| 2010/0272046 A1 | 10/2010 | Guo | | |

(Continued)

FOREIGN PATENT DOCUMENTS

| CN | 101562894 A | 10/2009 |
| CN | 101998522 A | 3/2011 |

(Continued)

OTHER PUBLICATIONS

MediaTek, Scheduling mechanism for carrier aggregation, 3GPP TSG-RAN WG2#69bis R2-102109, 3GPP, Apr. 2, 2010, 4 pages.

(Continued)

*Primary Examiner* — Charles C Jiang
*Assistant Examiner* — Thad Defauw
(74) *Attorney, Agent, or Firm* — Kilpatrick Townsend & Stockton LLP (57) ABSTRACT

Embodiments of the present invention provide a method and device for triggering Buffer State Reporting (BSR), which relate to the wireless communication field and are used to solve the problem of lacking a triggering mechanism for Device-to-Device communication Padding Buffer State Reporting (D2D Padding BSR) in the prior art. In an embodiment of the present invention, a user equipment determines the size of padding resources when organizing a Device-to-Network-link Media Access Control layer Protocol Data Unit (D2N MAC PDU), and decides whether to trigger the D2D Padding BSR or not according to the size of the padding resources and the priority of the Padding Buffer State Reporting Media Access Control layer Control Element carrying the Device-to-Device communication (D2D (Continued)

Padding BSR MAC CE), thereby the D2D Padding BSR triggering mechanism is achieved.

16 Claims, 5 Drawing Sheets

(51) Int. Cl.
- H04W 76/14 (2018.01)
- H04W 76/02 (2009.01)
- H04W 28/02 (2009.01)
- H04W 72/12 (2009.01)
- H04W 88/02 (2009.01)

(52) U.S. Cl.
CPC ......... *H04W 76/023* (2013.01); *H04W 76/14* (2018.02); *H04W 72/1284* (2013.01); *H04W 88/02* (2013.01)

(56) References Cited

U.S. PATENT DOCUMENTS

| | | |
|---|---|---|
| 2013/0258996 A1 | 10/2013 | Jung et al. |
| 2016/0374110 A1* | 12/2016 | Lee ........................ H04W 4/023 |

FOREIGN PATENT DOCUMENTS

| | | |
|---|---|---|
| CN | 102111751 A | 6/2011 |
| CN | 103457881 A | 12/2013 |
| CN | 103874049 A | 6/2014 |
| EP | 3122103 A1 | 1/2017 |
| EP | 3122152 A1 | 1/2017 |
| WO | 2012160539 A1 | 11/2012 |
| WO | 2014007574 A1 | 1/2014 |
| WO | 2015142080 A1 | 9/2015 |

OTHER PUBLICATIONS

International Search Report and Written Opinion of PCT /CN2015/ 07 5283 (English and Chinese).
Catt: "020 Communication Resource Allocation Mode 1", 3GPP TSG RAN WG2 Meeting #85bis, R2-141195, 3rd Generation Partnership Project (3GPP), Mar. 31-Apr. 4, 2014, 4 pages.
"3rd Generation Partnership Project; Technical Specification Group Radio Access Network; Evolved Universal Terrestrial Radio Access (E-UTRA); Medium Access Control (MAC) protocol specification (Release 12)", 3GPP TS 36-321 V12.1.0, Mar. 20, 2014, 58 pages.
Ericsson: "Resource allocation for 020 transmitters in coverage", 3GPP TSG-RAN WG2 #85, R2-140625, Resource Allocation for Transmitters in Coverage, 3rd Generation Partnership Project (3GPP), Feb. 10-14, 2014, 6 pages.

\* cited by examiner

| D2N media access control CE sub-header (Other than padding BSR media access control CE) | D2D media access control CE sub-header (Other than padding BSR media access control CE) | D2N Padding BSR media access control CE sub-header | D2D Padding BSR media access control CE sub-header | Media access control sub-header corresponding to D2N data |

METHOD AND DEVICE FOR TRIGGERING BUFFER STATE REPORTING BSR

This application is a US National Stage of International Application No. PCT/CN2015/075283, filed on Mar. 27, 2015, designating the United States, and claiming priority to Chinese Patent Application No. 201410125864.6, filed with the Chinese Patent Office on Mar. 31, 2014 and entitled "Method and apparatus for triggering Buffer Status Reporting (BSR)", the content of which is hereby incorporated by reference in its entirety.

FIELD

The present invention relates to the field of wireless communications, and particularly to a method and apparatus for triggering Buffer Status Reporting (BSR).

BACKGROUND

In future development of mobile communication systems, the mechanisms of Device to Device (D2D) discovery and Device to Device (D2D) communication have been introduced in order to better satisfy demands of their subscribers, and to improve the efficiency of exchanging information between devices.

Figure 1:
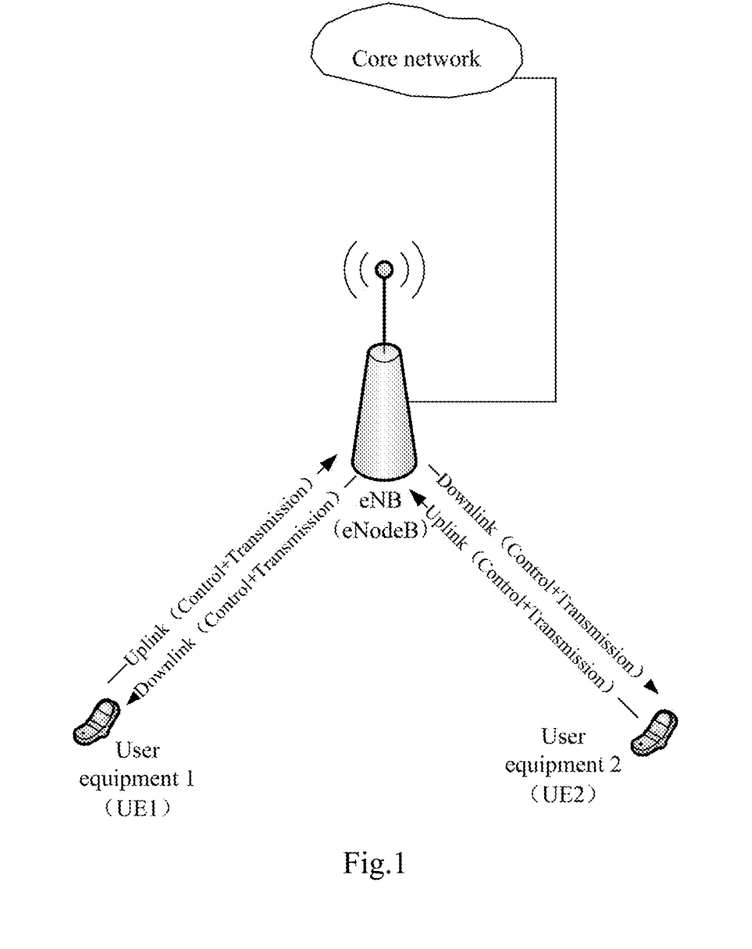
FIG. 1 is the architectural diagram of the system in the D2N transmission mode in the prior art.

In a Long Term Evolution (LTE) system, communication is controlled centrally by a network in a Device to Network (D2N) transmission mode in FIG. 1, which illustrates the architectural diagram of the system in the D2N transmission mode. As illustrated in FIG. 1, both uplink and downlink data of a User Equipment (UE) (i.e., a terminal) are controlled by an evolved Node B (eNB) (i.e., a base station) to be transmitted and received, where communication between one UE and another UE is forwarded and controlled by the eNB, so there is no direct communication link between the UE and the other UE.

In the versions prior to the LTE Rel-11, mechanisms for triggering a Buffer Status Reporting (BSR) in the architecture of the D2N system include a regular BSR, a periodic BSR, and a padding BSR.

After the base station allocates an uplink resource for the UE, if the size of the uplink resource is exactly sufficient to transmit uplink data, then the UE will transmit the uplink data over the uplink resource without triggering any BSR; or if the uplink resource is not sufficient to transmit all the uplink data, then the UE will preferentially make a regular BSR or a periodic BSR, and the base station will further schedule subsequent transmission according to the amount of uplink data required for the UE carried in the BSR. The UE composes a Media Access Control (MAC) Protocol Data Unit (PDU) so that there is at most one BSR in an MAC PDU, and if there are a number of BSRs triggered concurrently, then the UE will report only the BSR at the highest priority, where the priority of the regular BSR is equal to the priority of the periodic BSR, which is higher than the priority of the padding BSR.

Figure 2:
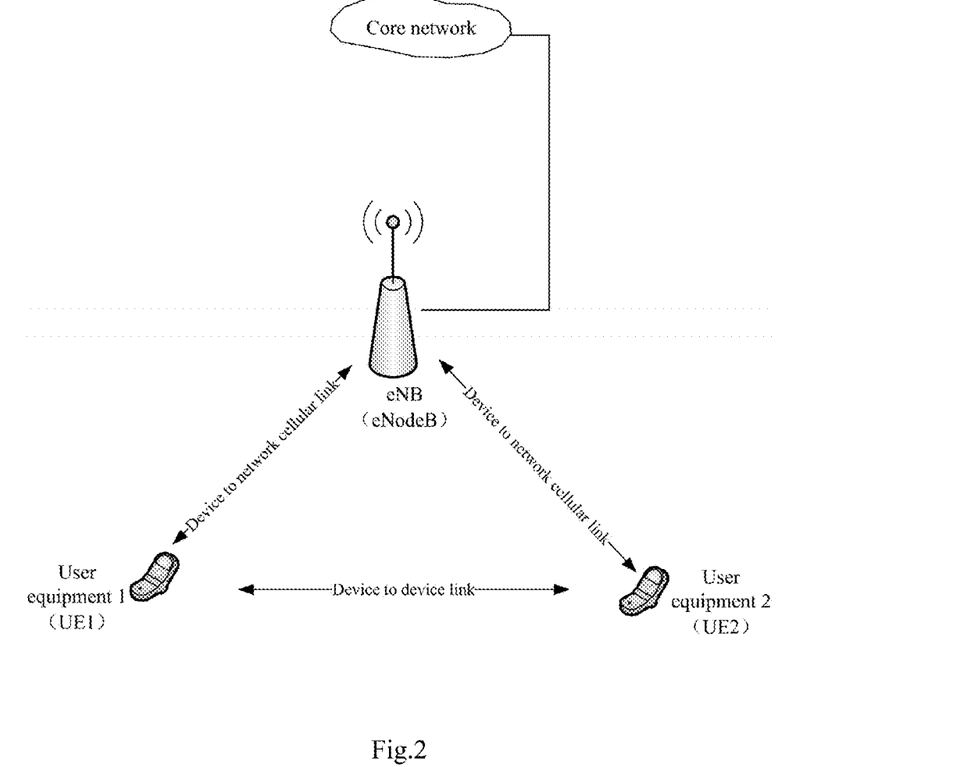
FIG. 2 is the architectural diagram of the system in the D2D transmission mode in the prior art.

In the LTE system, D2D communication transmission is allowed to be conducted directly between one device and another device proximate to each other in FIG. 2 illustrating the architectural diagram of the system in the D2D transmission mode. As illustrated in FIG. 2, a communication link between one UE and the other UE is a Device to Device (D2D) link, and a cellular communication link between the UE and the eNB is a Device to Network (D2N) link. In a D2D communication resource allocation scheme, the base station allocates a resource for carrying D2D communication scheduling signaling, and a resource for carrying D2D communication data. Thus the UE needs to request the eNB for a D2D transmission resource over the D2N cellular link in a D2D resource request procedure performed through and separate from a D2N BSR procedure.

Mechanisms for triggering a D2D BSR include a D2D regular BSR, a D2D periodic BSR, and a D2D padding BSR. The mechanisms for triggering the D2D regular BSR and the D2D periodic BSR can be the same as the mechanisms for triggering the D2N regular BSR and the D2N periodic BSR, but a new trigger mechanism needs to be introduced for the mechanism for triggering the D2D padding BSR unlike the mechanism for triggering the D2N padding BSR.

SUMMARY

Embodiments of the invention provide a method and apparatus for triggering a BSR so as to address the problem in the prior art of the absence of a mechanism for triggering a D2D padding BSR.

An embodiment of the invention provides a method for triggering a BSR, the method including:

determining, by a user equipment, the size of padding resources when the user equipment composes a D2N MAC PDU, wherein the D2N MAC PDU is a device to network media access control protocol data unit; and deciding, by the user equipment, whether to trigger a D2D padding BSR, according to the size of the padding resources, and the priority of D2D padding BSR MAC CE, wherein the D2D padding BSR MAC CE is media access control layer control element for carrying a device to device communication padding buffer status reporting, and the D2D padding BSR is a device to device communication padding buffer status reporting.

An embodiment of the invention provides an apparatus for triggering a BSR, the apparatus including:

a determining unit configured to determine the size of padding resources when composing a D2N MAC PDU, wherein the D2N MAC PDU is a device to network media access control protocol data unit; and a deciding unit configured to decide whether to trigger a D2D padding BSR, according to the size of the padding resources, and the priority of D2D padding BSR MAC CE, wherein the D2D padding BSR MAC CE is a media access control layer control element for carrying a device to device communication padding buffer status reporting, and the D2D padding BSR is a device to device communication padding buffer status reporting.

In the embodiments above of the invention, the user equipment, when composing the D2N MAC PDU, determines the size of the padding resources, and decides whether to trigger a D2D padding BSR, according to the size of the padding resources, and the priority of the D2D padding BSR MAC CE to thereby implement the mechanism for triggering a D2D padding BSR.

BRIEF DESCRIPTION OF THE DRAWINGS

In order to make the technical solutions according to the embodiments of the invention more apparent, the drawings to which a description of the embodiments refers will be briefly introduced below, and apparently the drawings to be described below are merely illustrative of some of the embodiments of the invention, and those ordinarily skilled in the art can derive from these drawings other drawings without any inventive effort. In the drawings.

DETAILED DESCRIPTION OF THE EMBODIMENTS

In order to make the objects, technical solutions, and advantages of the embodiments of the invention more apparent, the invention will be described below clearly and fully with reference to the drawings, and apparently the embodiments described below are only a part but not all of the embodiments of the invention. Based upon the embodiments here of the invention, all the other embodiments which can occur to those skilled in the art without any inventive effort shall fall into the scope of the invention.

Figure 3:
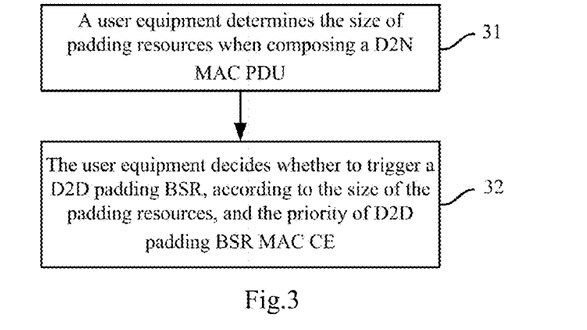
FIG. 3 is a schematic flow chart of a method for triggering a BSR according to an embodiment of the invention.

Referring to FIG. 3 which is a schematic flow chart of a method for triggering a BSR according to an embodiment of the invention, a process of triggering a D2D padding BSR can include:

Step 31: When a user equipment composes a D2N MAC PDU, the user equipment determines the size of padding resources, where the padding resources are uplink resources allocated to the user equipment in a sub-frame where the D2N MAC PDU is located, from which resources occupied by D2N data and control information to be transmitted by the user equipment are subtracted.

Preferably the user equipment can determine the size of the padding resources for deciding whether to trigger a D2D padding BSR, by subtracting the following resources from the uplink resources of the user equipment in the sub-frame where the D2N MAC PDU is located:

Resources occupied by other D2N MAC CE than D2N MAC CE for carrying a D2N padding BSR, where the resources occupied by the D2N MAC CE include resources occupied by a MAC sub-header and a payload;

Resources occupied by logical channel data over a D2N link other than a UL-CCCH, where the resources occupied by the logical channel data over the D2N link includes resources occupied by a MAC sub-header and a payload; and Resources occupied by other D2D MAC CE than D2D MAC CE for carrying a D2D padding BSR, where the resources occupied by the D2D MAC CE include resources occupied by a MAC sub-header and a payload.

Furthermore the size of the padding resources is determined by subtracting the following resources from the uplink resources of the user equipment in the sub-frame where the D2N MAC PDU is located, according to the following first priority order or second priority order.

The first priority order from high priority to low priority includes: the resources occupied by other D2N MAC CE than D2N MAC CE for carrying a D2N padding BSR, the resources occupied by logical channel data over a D2N link other than a UL-CCCH, and the resources occupied by other D2D MAC CE than D2D MAC CE for carrying a D2D padding BSR.

The second priority order from high priority to low priority includes: the resources occupied by other D2N MAC CE than D2N MAC CE for carrying a D2N padding BSR, the resources occupied by other D2D MAC CE than D2D MAC CE for carrying a D2D padding BSR, and the resources occupied by logical channel data over a D2N link other than a UL-CCCH.

In a particular implementation, if the size of the resources allocated by a base station to the user equipment in the uplink sub-frame is more than the size of the resource occupied by the D2N data (including the corresponding MAC sub-header and payload) and the control information (other than a D2N padding BSR) to be transmitted by the user equipment in the sub-frame, then the user equipment will determine at this time that there are padding resources, and the size of the padding resources is the uplink resources allocated by the base station in the sub-frame, from which the resources occupied by other D2N MAC CEs than D2N MAC CE for carrying a D2N padding BSR, the resources occupied by logical channel data over a D2N link other than a UL-CCCH, and the resources occupied by other D2D MAC CE than D2D MAC CE for carrying a D2D padding BSR are subtracted.

Step 32: The user equipment decides whether to trigger a D2D padding BSR, according to the size of the padding resources, and the priority of D2D padding BSR MAC CEs, where the D2D padding BSR MAC CEs are media access control layer control elements for carrying a device to device communication padding buffer status reporting, the D2D padding BSR is a device to device communication padding buffer status reporting, and the D2N padding BSR is a device to network padding buffer status reporting.

Preferably if the priority of the D2D padding BSR MAC CEs is lower than priority of the D2N padding BSR MAC CEs, then if the padding resources determined in the step 31 above are sufficient to carry a D2D padding BSR and a D2N padding BSR, then the user equipment will decide to trigger a D2D padding BSR and a D2N padding BSR; or if the padding resources determined in the step 31 above, from which the resources for carrying a D2N padding BSR are subtracted, are not sufficient to carry a D2D padding BSR, then the user equipment will decide to trigger a D2N padding BSR, but not to trigger a D2N padding BSR.

Figure 4:
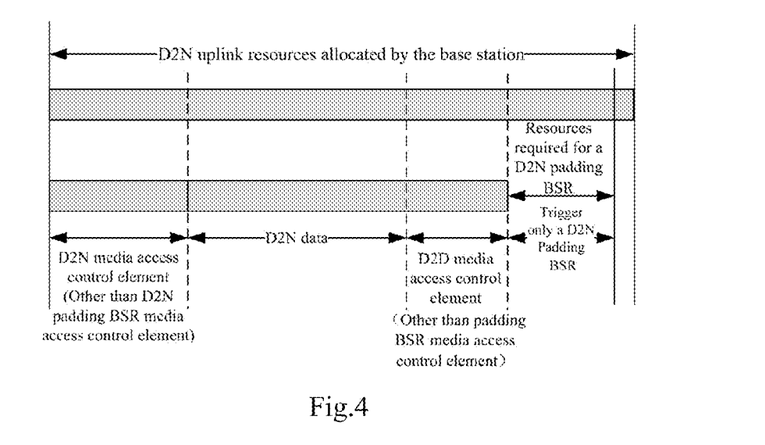
FIG. 4 is a schematic flow chart of deciding to trigger a D2N padding BSR according to an embodiment of the invention.
Figure 5:
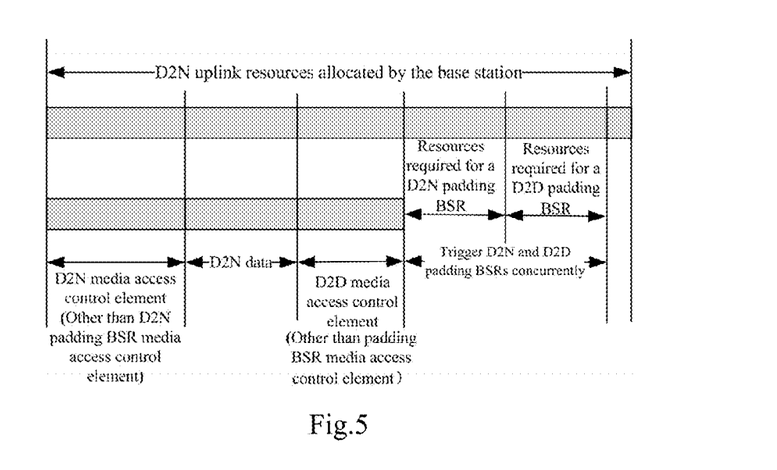
FIG. 5 is a schematic flow chart of deciding to trigger a D2D padding BSR and a D2N padding BSR according to an embodiment of the invention.

By way of an example, as illustrated in FIG. 4, if the padding resources are only sufficient to carry a D2N padding BSR (including the MAC sub-header and the payload), then the user equipment will decide to trigger a D2N padding BSR, but not to trigger a D2D padding BSR. As illustrated in FIG. 5, if the padding resources are sufficient to carry a D2D padding BSR (including the MAC sub-header and the payload) and a D2N padding BSR (including the MAC sub-header and the payload) concurrently, then the user equipment will decide to trigger a D2D padding BSR and a D2N padding BSR concurrently.

If the priority of the D2D padding BSR MAC CE is higher than the priority of the D2N padding BSR MAC CE, then if the padding resources determined in the step 31 above are sufficient to carry a D2D padding BSR (including the MAC sub-header and the payload), then the user equipment will decide to trigger a D2D padding BSR.

Furthermore if the padding resources determined in the step 31 above, from which the resources for carrying a D2D padding BSR are subtracted, are not sufficient to carry a D2N padding BSR, then the user equipment will decide to trigger a D2D padding BSR, but not to trigger a D2N padding BSR; and if the padding resources determined in the step 31 above are sufficient to carry a D2D padding BSR (including the MAC sub-header and the payload) and a D2N padding BSR (including the MAC sub-header and the payload), then the user equipment will decide to trigger a D2D padding BSR and a D2N padding BSR.

Figure 6:
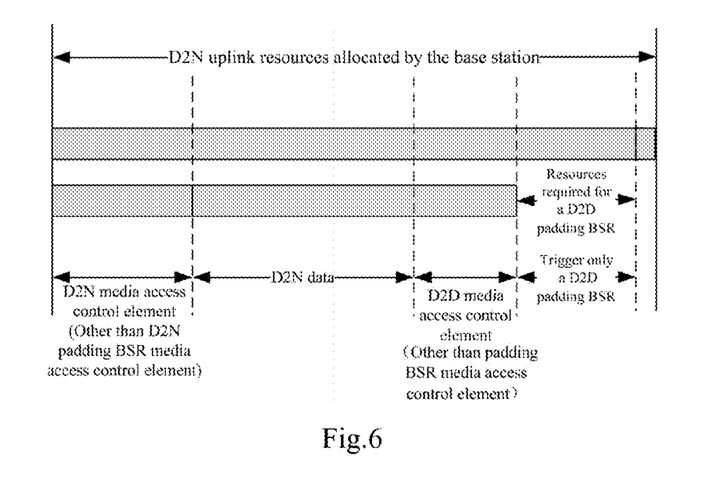
FIG. 6 is a schematic flow chart of deciding to trigger a D2D padding BSR according to an embodiment of the invention.
Figure 7:
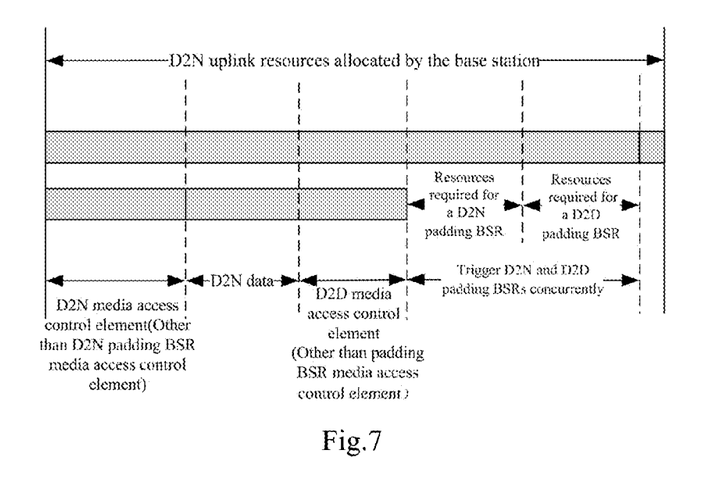
FIG. 7 is another schematic flow chart of deciding to trigger a D2D padding BSR and a D2N padding BSR according to an embodiment of the invention.

By way of an example, if the priority of the D2D padding BSR MAC CE is higher than the priority of the D2N padding BSR MAC CE, then as illustrated in FIG. 6, if the padding resources are only sufficient to carry a D2D padding BSR (including the MAC sub-header and the payload), then the user equipment will decide to trigger a D2D padding BSR, but not to trigger a D2N padding BSR. As illustrated in FIG. 7, if the padding resources are sufficient to carry a D2D padding BSR (including the MAC sub-header and the payload) and a D2N padding BSR (including the MAC sub-header and the payload) concurrently, then the user equipment will decide to trigger a D2D padding BSR and a D2N padding BSR concurrently.

After the step 32, the user equipment needs to compose the uplink data into the MAC PDU, and to deliver the MAC PDU to a protocol layer below the MAC layer for transmission. The user equipment composes the MAC PDU so that the MAC sub-header corresponding to the MAC CE included in the D2N MAC PDU are placed before the MAC sub-header corresponding to the data element included therein; and in the D2N MAC PDU, the MAC CE and the data element are placed in the MAC PDU payload in an order matching the order in which the corresponding MAC sub-headers are placed.

Figure 8:
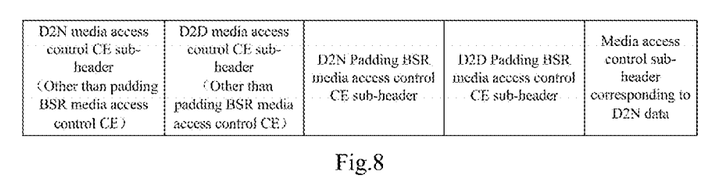
FIG. 8 is a schematic diagram of a format of MAC sub-header according to an embodiment of the invention.

By way of an example where the MAC PDU sub-headers include MAC sub-header corresponding to the resources occupied by other D2N MAC CE than D2N MAC CE for carrying a D2N padding BSR, the resources occupied by other D2D MAC CE than D2D MAC CE for carrying a D2D padding BSR, the D2N padding BSR MAC CE, the D2D padding BSR MAC CE, and the D2N data, FIG. 8 illustrates a possible format of the MAC sub-header, where the MAC sub-headers are placed in such an order that the sub-header of the other D2N MAC CE than D2N MAC CE for carrying a D2N padding BSR, the sub-header of other D2D MAC CE than D2D MAC CE for carrying a D2D padding BSR, the D2N padding BSR MAC CE sub-header, the D2D padding BSR MAC CE sub-header, and the MAC sub-header corresponding to the D2N data.

In the embodiments above of the invention, when the user equipment composes the D2N MAC PDU, the user equipment determines the size of the padding resources, and decides whether to trigger a D2D padding BSR, according to the size of the padding resources, and the priority of the D2D padding BSR MAC CE to thereby implement the mechanism for triggering a D2D padding BSR.

Figure 9:
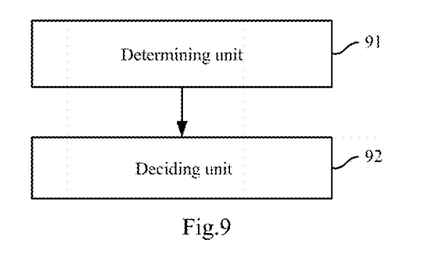
FIG. 9 is a schematic structural diagram of an apparatus for triggering a BSR according to an embodiment of the invention.

Based upon the same technical idea as the embodiments above, an embodiment of the invention further provides an apparatus for triggering a BSR as illustrated in FIG. 9, which includes:

A determining unit 91 is configured to determine the size of padding resources when composing a D2N MAC PDU, where the D2N MAC PDU is a device to network media access control protocol data unit; and A deciding unit 92 is configured to decide whether to trigger a D2D padding BSR, according to the size of the padding resources, and the priority of D2D padding BSR MAC CE, where the D2D padding BSR MAC CE is a media access control layer control element for carrying a device to device communication padding buffer status reporting, and the D2D padding BSR is a device to device communication padding buffer status reporting.

Preferably the deciding unit 92 is configured, if the priority of the D2D padding BSR MAC CE is lower than the priority of D2N padding BSR MAC CE, then if the padding resources are sufficient to carry a D2D padding BSR and a D2N padding BSR, to decide to trigger a D2D padding BSR and a D2N padding BSR; or if the padding resources, from which the resources for carrying a D2N padding BSR are subtracted, are not sufficient to carry a D2D padding BSR, to decide to trigger a D2N padding BSR, but not to trigger a D2D padding BSR, where the D2N padding BSR is a device to network padding buffer status reporting; and if the priority of the D2D padding BSR MAC CE is higher than the priority of the D2N padding BSR MAC CE, then if the padding resources are sufficient to carry a D2D padding BSR, to decide to trigger a D2D padding BSR.

Preferably the deciding unit 92 is configured, if the padding resources, from which the resources for carrying a D2D padding BSR are subtracted, are not sufficient to carry a D2N padding BSR, to decide to trigger a D2D padding BSR, but not to trigger a D2N padding BSR; and if the padding resources are sufficient to carry a D2D padding BSR and a D2N padding BSR, to decide to trigger a D2D padding BSR and a D2N padding BSR.

Preferably the determining unit 91 is configured to determine the size of the padding resources by subtracting the following resources from uplink resources of the user equipment in a sub-frame where the D2N MAC PDU is located: resources occupied by other D2N MAC CE than D2N MAC CE for carrying a D2N padding BSR, where the occupied resources include resources occupied by a MAC sub-header and a payload; resources occupied by logical channel data over a D2N link other than an Uplink Common Control Channel (UL-CCCH), where the occupied resources include resources occupied by a MAC sub-header and a payload; and resources occupied by other D2D MAC CE than D2D MAC CE for carrying a D2D padding BSR, where the occupied resources include resources occupied by a MAC sub-header and a payload.

Preferably the determining unit 91 is configured to subtract the resources the uplink resources of the user equipment in the sub-frame where the D2N MAC PDU is located, in a first priority order or a second priority order, where the first priority order from high priority to low priority includes the resources occupied by other D2N MAC CE than D2N MAC CE for carrying a D2N padding BSR, the resources occupied by logical channel data over a D2N link other than a UL-CCCH, and the resources occupied by other D2D MAC CE than D2D MAC CE for carrying a D2D padding BSR; and the second priority from high priority to low priority includes the resources occupied by other D2N MAC CE than D2N MAC CE for carrying a D2N padding BSR, the resources occupied by other D2D MAC CE than D2D MAC CE for carrying a D2D padding BSR, and the resources occupied by logical channel data over a D2N link other than a UL-CCCH.

Preferably the MAC sub-header corresponding to the MAC CE included in the D2N MAC PDU is placed before the MAC sub-header corresponding to the data element included therein; and in the D2N MAC PDU, the MAC CE and the data element are placed in the MAC PDU payload in an order matching the order in which the corresponding MAC sub-headers are placed.

Figure 10:
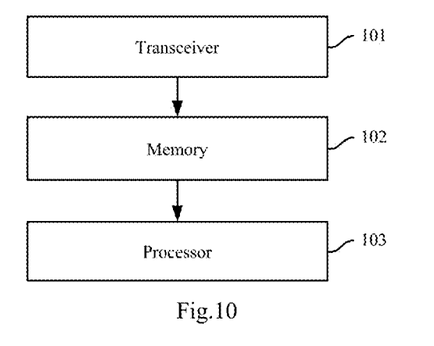
FIG. 10 is a schematic structural diagram of a user equipment according to an embodiment of the invention.

Anther embodiment of the invention further provides a user equipment which can perform the flow according to the embodiments above of the invention. As illustrated in FIG. 10, the user equipment can include a transceiver 101, a memory 102, and a processor 103, where:

The transceiver 101 can include a baseband processing component, a radio frequency processing component, and other devices, configured to transmit and receive related information, as needed;

The memory 102 is configured to store one or more executable programs configured to configure the processor; and The processor 103 is configured with the one or more executable programs to perform the method including: determining the size of padding resources while composing a D2N MAC PDU, where the D2N MAC PDU is a device to network media access control protocol data unit; and deciding whether to trigger a D2D padding BSR, according to the size of the padding resources, and the priority of D2D padding BSR MAC CE, where the D2D padding BSR MAC CE is a media access control layer control element for carrying a device to device communication padding buffer status reporting, and the D2D padding BSR is a device to device communication padding buffer status reporting.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for triggering a Buffer Status Reporting (BSR), the method comprising:
   determining, by a user equipment, the size of padding resources when the user equipment composes a D2N MAC PDU, wherein the D2N MAC PDU is a device to network media access control protocol data unit; and
   deciding, by the user equipment, whether to trigger a D2D padding BSR, according to the size of the padding resources, and the priority of D2D padding BSR MAC CE, wherein the D2D padding BSR MAC CE is a media access control layer control element for carrying a device to device communication padding buffer status reporting, and the D2D padding BSR is a device to device communication padding buffer status reporting;
   wherein determining the size of the padding resources comprises:
   subtracting resources from uplink resources of the user equipment in a sub-frame where the D2N MAC PDU is located, wherein the resources include:
   resources occupied by an D2N MAC CE other than D2N MAC CE for carrying a D2N padding BSR, wherein the occupied resources comprise resources occupied by a first MAC sub-header and a first payload;
   resources occupied by logical channel data over a D2N link other than an Uplink Common Control Channel (UL-CCCH), wherein the occupied resources comprise resources occupied by a second MAC sub-header and a second payload; and
   resources occupied by an D2D MAC CE other than D2D MAC CE for carrying a D2D padding BSR, wherein the occupied resources comprise resources occupied by a third MAC sub-header and a third payload.

2. The method according to claim 1, wherein deciding, by the user equipment, whether to trigger a D2D padding BSR, according to the size of the padding resources, and the priority of the D2D padding BSR MAC CEs comprises:
   if the priority of the D2D padding BSR MAC CE is lower than the priority of D2N padding BSR MAC CE, then
      if the padding resources are sufficient to carry a D2D padding BSR and a D2N padding BSR, then deciding to trigger the D2D padding BSR and the D2N padding BSR; or if the padding resources, from which the resources for carrying a D2N padding BSR are subtracted, are not sufficient to carry a D2D padding BSR, deciding to trigger the D2N padding BSR, but not to trigger the D2D padding BSR; and
   if the priority of the D2D padding BSR MAC CE is higher than the priority of the D2N padding BSR MAC CE, then if the padding resources are sufficient to carry the D2D padding BSR, then deciding to trigger the D2D padding BSR.

3. The method according to claim 1, wherein the resources are subtracted from the uplink resources of the user equipment in the sub-frame where the D2N MAC PDU is located, in a first priority order or a second priority order, wherein:

the first priority order from high priority to low priority is:
the resources occupied by other D2N MAC CE than D2N MAC CE for carrying the D2N padding BSR;
the resources occupied by logical channel data over the D2N link other than the UL-CCCH; and
the resources occupied by other D2D MAC CE than D2D MAC CE for carrying the D2D padding BSR; and
the second priority order from high priority to low priority is:
the resources occupied by other D2N MAC CE than D2N MAC CE for carrying the D2N padding BSR,
the resources occupied by other D2D MAC CE than D2D MAC CE for carrying the D2D padding BSR, and
the resources occupied by logical channel data over the D2N link other than the UL-CCCH.

4. The method according to claim 1, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

5. The method according to claim 2, wherein if the priority of the D2D padding BSR MAC CE is higher than the priority of the D2N padding BSR MAC CE, then if the padding resources are sufficient to carry a D2D padding BSR, then deciding to trigger a D2D padding BSR comprises:
if the padding resources, from which the resources for carrying the D2D padding BSR are subtracted, are not sufficient to carry the D2N padding BSR, then deciding to trigger the D2D padding BSR, but not to trigger the D2N padding BSR; and
if the padding resources are sufficient to carry the D2D padding BSR and the D2N padding BSR, then deciding to trigger the D2D padding BSR and the D2N padding BSR.

6. The method according to claim 2, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

7. The method according to claim 3, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

8. The method according to claim 5, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

9. An apparatus for triggering a Buffer Status Reporting (BSR), the apparatus comprising:
a processor; and
a memory storing at least one instruction, wherein the processor is configured to execute the at least one instruction to:
determine the size of padding resources when composing a D2N MAC PDU, wherein the D2N MAC PDU is a device to network media access control protocol data unit; and
decide whether to trigger a D2D padding BSR, according to the size of the padding resources, and the priority of D2D padding BSR MAC CE, wherein the D2D padding BSR MAC CE is a media access control layer control element for carrying a device to device communication padding buffer status reporting, and the D2D padding BSR is a device to device communication padding buffer status reporting;
wherein the processor is configured to execute the at least one instruction to:
determine the size of the padding resources by subtracting resources from uplink resources of the user equipment in a sub-frame where the D2N MAC PDU is located, wherein the resources include:
resources occupied by an D2N MAC CE other than D2N MAC CE for carrying a D2N padding BSR, wherein the occupied resources comprise resources occupied by a first MAC sub-header and a first payload;
resources occupied by logical channel data over a D2N link other than an Uplink Common Control Channel (UL-CCCH), wherein the occupied resources comprise resources occupied by a second MAC sub-header and a second payload; and
resources occupied by an D2D MAC CE other than D2D MAC CE for carrying a D2D padding BSR, wherein the occupied resources comprise resources occupied by a third MAC sub-header and a third payload.

10. The apparatus according to claim 9, wherein the processor is configured to execute the at least one instruction:
if the priority of the D2D padding BSR MAC CE is lower than the priority of D2N padding BSR MAC CE, then if the padding resources are sufficient to carry a D2D padding BSR and a D2N padding BSR, decide to trigger the D2D padding BSR and the D2N padding BSR; or if the padding resources, from which the resources for carrying a D2N padding BSR are subtracted, are not sufficient to carry a D2D padding BSR, decide to trigger the D2N padding BSR, but not to trigger a D2D padding BSR, wherein the D2N padding BSR is a device to network padding buffer status reporting; and
if the priority of the D2D padding BSR MAC CE is higher than the priority of the D2N padding BSR MAC CE, then if the padding resources are sufficient to carry the D2D padding BSR, decide to trigger the D2D padding BSR.

11. The apparatus according to claim 9, wherein the processor is configured to execute the at least one instruction:
subtract the resources the uplink resources of the user equipment in the sub-frame where the D2N MAC PDU is located, in a first priority order or a second priority order, wherein:
the first priority order from high priority to low priority is:
the resources occupied by other D2N MAC CE than D2N MAC CE for carrying the D2N padding BSR;
the resources occupied by logical channel data over the D2N link other than the UL-CCCH; and
the resources occupied by other D2D MAC CE than D2D MAC CE for carrying the D2D padding BSR; and the second priority order from high priority to low priority is:
- the resources occupied by other D2N MAC CE than D2N MAC CE for carrying the D2N padding BSR;
- the resources occupied by other D2D MAC CE than D2D MAC CE for carrying the D2D padding BSR, and the resources occupied by logical channel data over the D2N link other than the UL-CCCH.

12. The apparatus according to claim 9, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

13. The apparatus according to claim 10, wherein the processor is configured to execute the at least one instruction to:
- if the padding resources, from which the resources for carrying the D2D padding BSR are subtracted, are not sufficient to carry the D2N padding BSR, decide to trigger the D2D padding BSR, but not to trigger the D2N padding BSR; and
- if the padding resources are sufficient to carry the D2D padding BSR and the D2N padding BSR, decide to trigger the D2D padding BSR and the D2N padding BSR.

14. The apparatus according to claim 10, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

15. The apparatus according to claim 11, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

16. The apparatus according to claim 13, wherein the MAC sub-header corresponding to the MAC CE comprised in the D2N MAC PDU are placed before the MAC sub-header corresponding to the data element comprised therein; and in the D2N MAC PDU, the MAC CE and the data element are placed in MAC PDU payload in an order matching the order in which the corresponding MAC sub-headers are placed.

* * * * *